April 6, 1943. H. V. PUTMAN 2,315,654
CORE
Filed Jan. 29, 1941
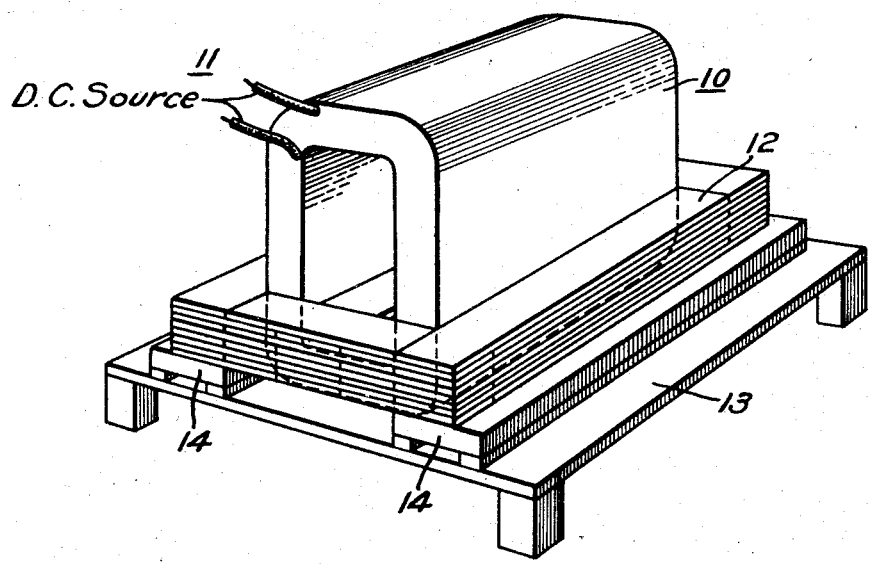
WITNESSES:
INVENTOR
Henry V. Putman.
ATTORNEY Patented Apr. 6, 1943

2,315,654

UNITED STATES PATENT OFFICE 2,315,654

CORE

Henry V. Putman, Sharon, Pa., assignor to Westinghouse Electric & Manufacturing Company, East Pittsburgh, Pa., a corporation of Pennsylvania Application January 29, 1941, Serial No. 376,405

4 Claims. (Cl. 29—84)

The invention relates to a method of assembling laminations of magnetic sheet material to provide core structures.

In the building of laminated core structures it has been known that the air spaces between the laminations of magnetic sheet material result in additional losses when the cores are utilized in such electrical equipment as transformers, inductors, etc. Thus the efficiency of the apparatus may be increased by building core structures with no air spaces or with greatly reduced air spaces.

The object of the present invention is to provide core structures for use in electrical apparatus which have low losses because of the small air spaces.

It is also an object of the invention to provide a method for drawing the laminations of sheet magnetic material into close contact with one another during the operation of assembling the laminations to provide the core structure.

Other objects of the invention will in part be obvious and in part appear hereinafter.

The invention, accordingly, comprises the several steps and the relation and order of one or more of such steps with respect to each of the others thereof, which will be exemplified in the method hereinafter disclosed, and the scope of the application of which will be indicated in the claims.

For a fuller understanding of the nature and objects of the invention, reference may be had to the following detailed description taken in connection with the accompanying drawing, in which The single figure is a perspective view of a transformer coil and a portion of a core illustrating how the core may be assembled in accordance with this invention.

In the use of cores of laminated magnetic material it is desirable to keep the exciting current required to build up a predetermined magnetic field as low as possible. Two of the factors which determine the amount of exciting current required are the permeability of the magnetic material and the air spaces between the laminations. It has been found in cores such as used in transformers that the air gaps at the joints of interleaved laminations cause appreciable cross flux and resulting losses.

In the present invention the core, during the assembling operation, is subjected to a magnetic field induced by direct current flowing in the transformer coils from a direct current circuit. This magnetic field converts the laminations as they are assembled into magnets which attract one another and thus the laminations as they are applied to the stack are drawn into close contact with one another at the joints, reducing the air spaces therebetween to a minimum.

In the diagrammatic showing the transformer coil 10 is connected to a suitable direct current source 11. Therefore, as the laminations 12 are assembled, they are subjected to a magnetic field of constant character which converts them into magnets that attract one another. When the laminations 12 are thus magnetized, they are drawn into very intimate contact, so reducing the air spaces between them that the exciting current required for energizing the core when it is employed in a transformer or similar apparatus will be small.

The shop equipment employed in building cores in accordance with this invention may be very simple. In the present showing a table 13 and a couple of frames 14, which may be disposed on the table, are provided. The table 13 and frames 14 are preferably made of steel. It is to be understood that in mass production the shop equipment may be designed to meet the requirements.

It has been found by making a test on a core assembled from laminations of Hipernik that the losses may be considerably reduced. Hipernik is a magnetic material or alloy comprising chiefly iron and nickel.

In running the test, two transformer cores of Hipernik were assembled. The transformer core which is identified as I was assembled by stacking the laminations in interleaved relation without subjecting them to a magnetic field. The core identified hereinafter as II and which comprises the same number of laminations of the same gauge sheet was assembled in interleaved relation in a magnetic field induced from a direct current source.

After the two cores were assembled they were subjected to the same operating conditions and the exciting current measured. As is well known, the exciting current required for transformer cores consists of an in-phase current and an out-of-phase current which may be said to result in a true watt loss and an apparent watt loss, respectively. The apparent watt loss results from the out-of-phase current which lags 90°. This apparent watt loss is a load imposed on the system as a result of the current required for exciting the core.

The following table reveals that the apparent watt loss for the core II which was assembled in the magnetic field was much lower than for the core assembled by stacking the laminations in the usual way. The percentage reduction in the apparent watt loss ran as high as 41.8% when the core was worked at a flux density of 10,000 gausses. It will be readily appreciated that this is a very appreciable saving. The table is as follows:

| Magnetic flux density in gausses | I | | II | | Percent reduction in apparent watts loss |
| --- | --- | --- | --- | --- | --- |
| | True watts loss | Apparent watts loss | True watts loss | Apparent watts loss | |
| 10,000 | .670 | 4.78 | .678 | 2.78 | 41.8 |
| 12,000 | .921 | 11.30 | .942 | 7.8 | 31.0 |
| 13,000 | 1.094 | 17.40 | 1.11 | 13.53 | 22.2 |
| 14,000 | 1.26 | 29.60 | 1.27 | 24.6 | 16.9 |
| 15,000 | 1.462 | 47.70 | 1.476 | 41.3 | 13.4 |
| 15,500 | 1.588 | 72.30 | 1.588 | 64.1 | 11.3 |

The assembling of the cores in a magnetic field induced from a direct current is not a difficult operation; it lends itself very nicely to commercial application and does not add greatly to the manufacturing costs of cores. Therefore, the advantages to be gained by such a method have great economic value.

Since certain changes may be made in carrying out the above method without distinguishing from the scope of the invention, it is intended that all matter contained in the above description shall be interpreted as illustrative and not in a limiting sense.

I claim as my invention:

1. In the method of assembling a laminated magnetic core around an electrical coil the step of energizing the coil with direct current to provide a magnetic field in which the laminations are assembled thereby to draw the laminations into close contact with one another as they are assembled.

2. In the method of assembling laminations of magnetic sheet material to provide a core in combination with an electrical coil the steps of energizing the coil from a direct current source to provide a magnetic field having a constant characteristic and the assembling of the laminations of magnetic sheet material in predetermined relation in the magnetic field, the magnetic field having a constant characteristic and thereby serving to draw the laminations of magnetic material together to reduce the air spaces between adjacent laminations.

3. In the method of assembling a plurality of laminations of magnetic material to provide a core in combination with an electrical coil the steps of assembling the laminations of magnetic sheet material to provide a core of predetermined shape while the coil is energized from a direct current source to provide a magnetic field of constant character to draw the laminations of magnetic material into close contact with one another.

4. In the method of assembling a coil and core structure which comprises exciting the coil with direct current to establish a magnetic field having a constant characteristic and assembling laminations of magnetic material in predetermined relative positions around the coil, the lines of force of the magnetic field serving to draw the laminations of magnetic material as they are assembled into close contact with one another thereby producing a core with small air spaces between the laminations.

HENRY V. PUTMAN.